United States Patent [19]

Hollrock

[11] 4,251,187
[45] Feb. 17, 1981

[54] BLADE RETENTION BEARING FOR HELICOPTER ROTOR

[75] Inventor: Richard H. Hollrock, Simsbury, Conn.

[73] Assignee: Kaman Aerospace Corporation, Bloomfield, Conn.

[21] Appl. No.: 909,678

[22] Filed: May 25, 1978

[51] Int. Cl.$^2$ ............................................. B64C 27/38
[52] U.S. Cl. ................................ 416/134 A; 416/141; 403/226
[58] Field of Search ............... 416/134 A, 138 A, 141; 403/225, 226, 228

[56] References Cited

U.S. PATENT DOCUMENTS

| | | | |
|---|---|---|---|
| 667,037 | 1/1901 | Richter et al. | 403/225 |
| 1,954,277 | 4/1934 | Zerk | 403/228 |
| 3,759,631 | 9/1973 | Rybicki | 416/134 A |

*Primary Examiner*—John J. Vrablik
*Attorney, Agent, or Firm*—McCormick, Paulding & Huber

[57] ABSTRACT

A hub assembly for a helicopter rotor system having a monolithic thin-wall hub shell made from composite material and including centrally apertured upper and lower wall portions integrally joined at the outer periphery of the shell and spaced apart at inner regions. The upper and lower wall portions cooperate to define a plurality of bearing sockets angularly spaced relative to the axis of rotation and connecting webs extending between angularly adjacent sockets. Elastomeric blade retaining bearing assemblies supported within the sockets retain and support rotor blades for articulate movement. Each bearing assembly has a seating surface which cooperates with an associated bearing surface on the socket in which it is contained to prevent relative rotation therebetween. Mounting flanges on the helicopter rotor shaft and retaining flanges on the hub shell are arranged to permit the rotor system to be lowered on the rotor shaft when the retaining flanges are disconnected from the mounting flanges.

7 Claims, 14 Drawing Figures

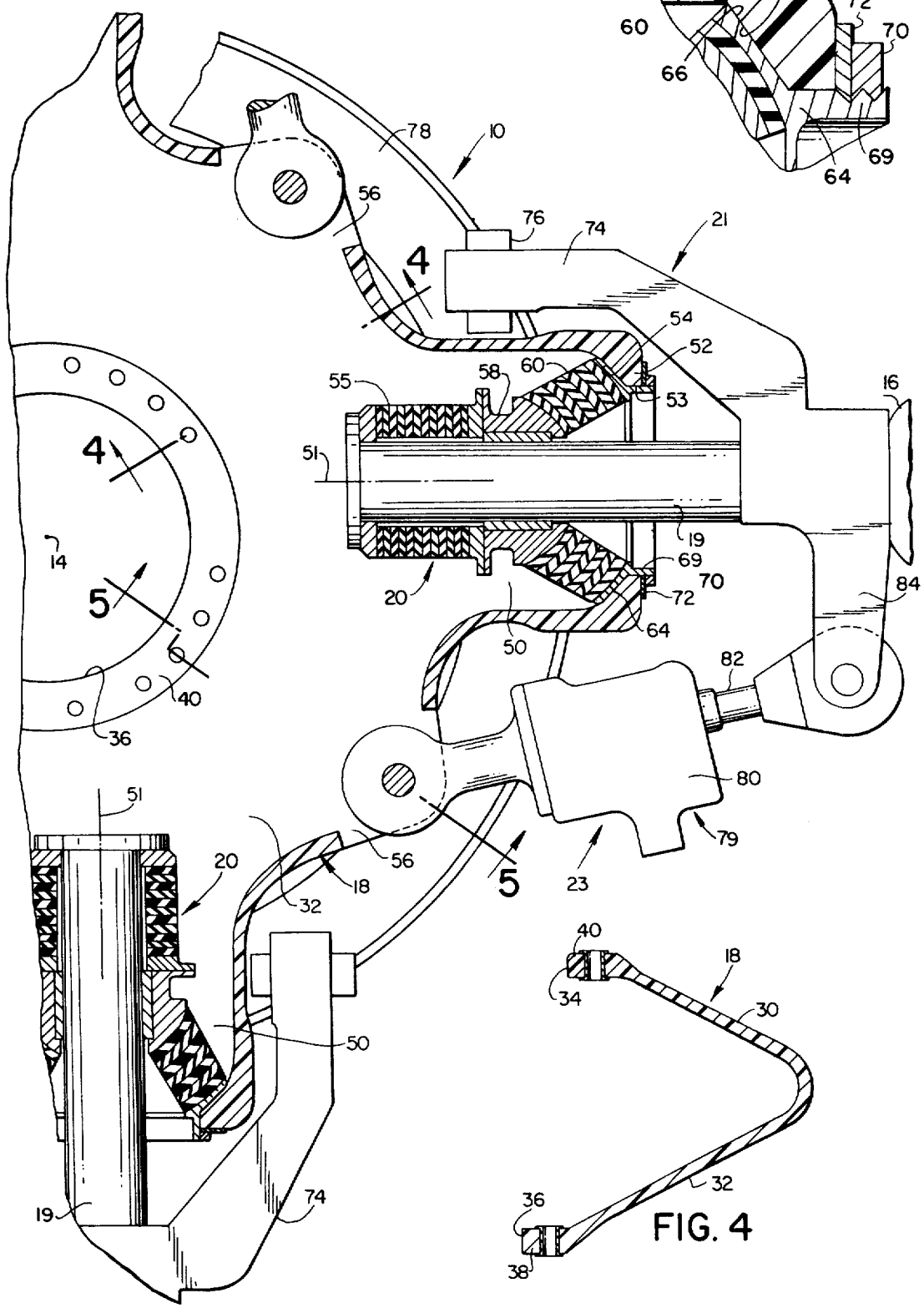
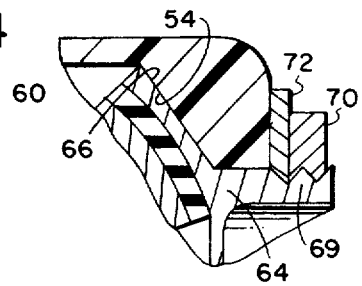

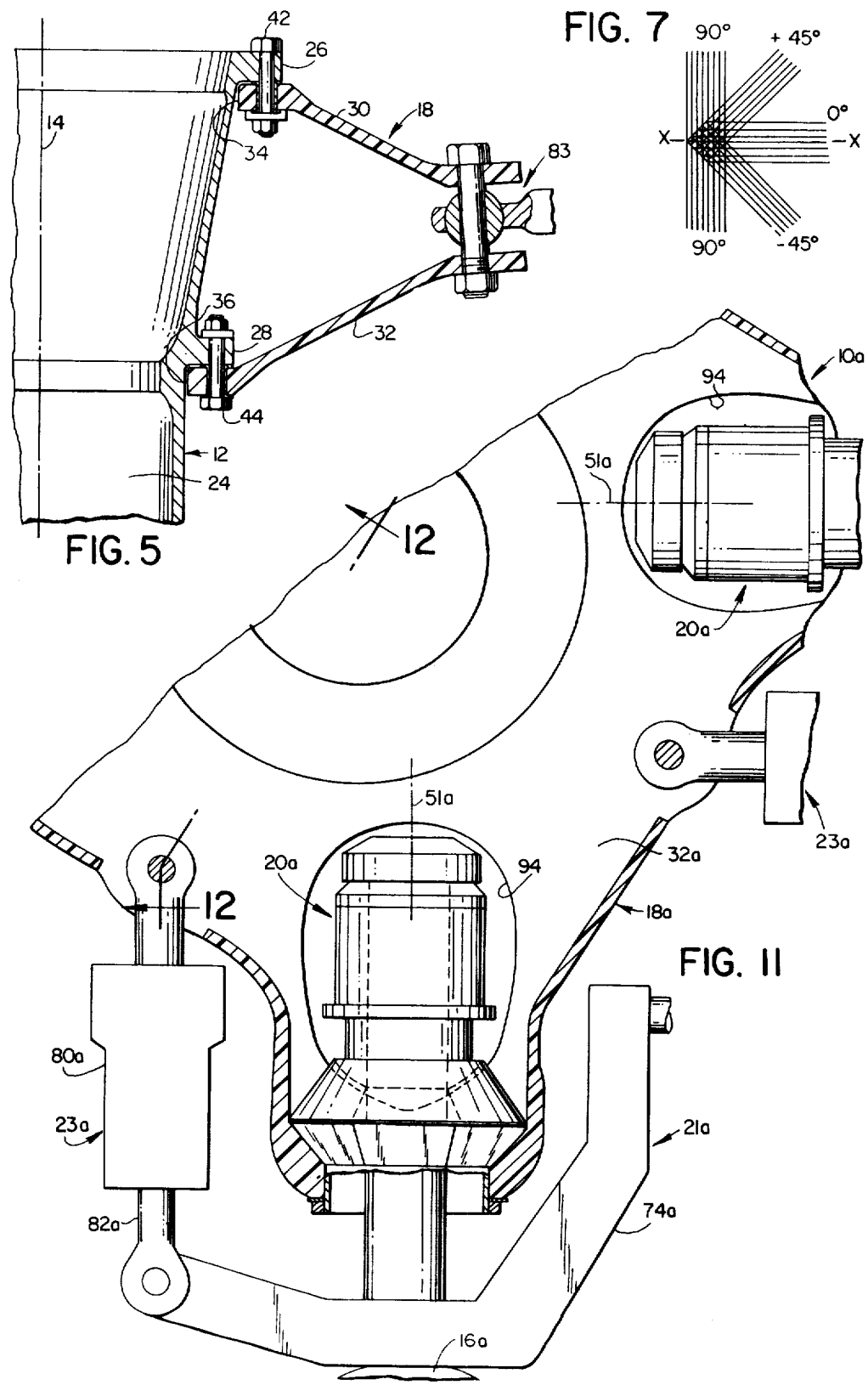

BLADE RETENTION BEARING FOR HELICOPTER ROTOR

CROSS-REFERENCE TO RELATED APPLICATION

Subject matter shown and claimed in this application is also shown and claimed in the copending application Ser. No. 909,694 entitled "HUB ASSEMBLY" filed on May 25, 1978.

BACKGROUND OF THE INVENTION

This invention relates in general to articulated rotor systems for helicopters of the type which utilize elastomeric blade retention bearings and deals more particularly with improved blade retention means for such rotor assemblies.

A conventional rotor system of the aforedescribed general type usually includes a rotor hub which defines a plurality of generally radially outwardly opening blade attachment chambers. Each chamber contains an elastomeric blade retention bearing which retains an associated rotor blade in assembly with the rotor hub and further supports it for articulated motion relative to the hub. A typical rotor system of the aforedescribed type is illustrated and described in U.S. Pat. No. 3,759,631 to Rybicki, issued Sept. 18, 1973. Typically, the outer face of the blade retention bearing is bolted to the hub and formed the outer end wall of the blade attachment chamber in which it is contained. Such arrangement is generally satisfactory for use with a rotor system of the type which includes a metal hub structure, however, it is not suitable for use with a nonmetallic rotor hub, as, for example, a hub made from composite material which includes layers of woven fabric or fibrous material held together by a suitable binder such as epoxy resin. The present invention is concerned with the provision of improved blade retention means for rotor hubs of the latter type.

SUMMARY OF THE INVENTION

In accordance with the present invention an articulated rotor system for a helicopter comprises a rotor hub having a bearing socket which contains a laminated elastomeric blade retention bearing. The bearing has an outwardly facing seating surface which engages and complements an opposing bearing surface defined by an apertured end wall of said hub shell and means for releasably retaining the bearing assembly in connected relation to the hub shell with the seating surface in complementary face-to-face engagement with the bearing surface. The bearing surface and the seating surface comprise means for restraining the bearing against rotation relative to the hub shell.

BRIEF DESCRIPTION OF THE DRAWINGS

FIG. 3 is a fragmentary sectional view taken generally along the line 3—3 of FIG. 2.

FIG. 4 is a sectional view through the hub assembly taken along the line 4—4 of FIG. 3.

FIG. 5 is a sectional view taken along the line 5—5 of FIG. 3.

FIG. 7 is a schematic view and illustrates a preferred orientation of fibres in the composite hub structure.

FIG. 11 is a sectional view taken along the line 11—11 of FIG. 10.

FIG. 14 is a somewhat enlarged fragmentary sectional view of a portion of the hub assembly as it appears in FIGS. 1-3.

BRIEF DESCRIPTION OF PREFERRED EMBODIMENTS

Figure 1:
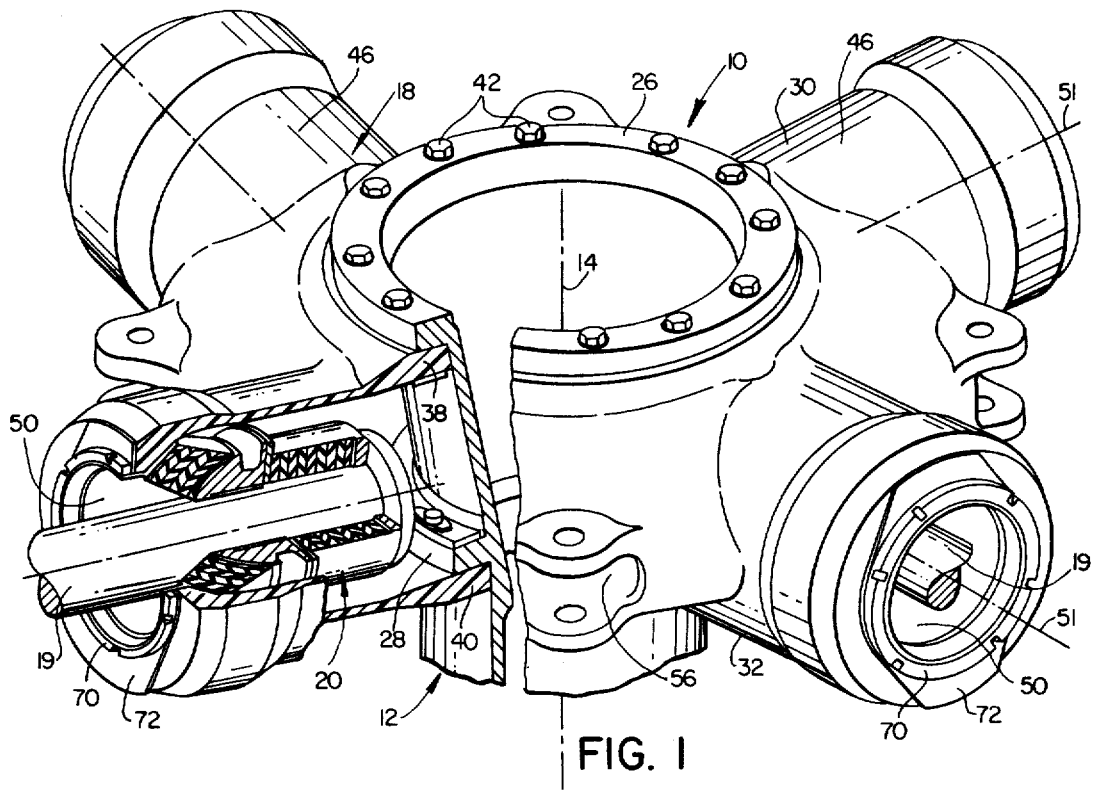
FIG. 1 is a fragmentary perspective view of a hub assembly embodying the present invention and shown partially in axial section.
Figure 2:
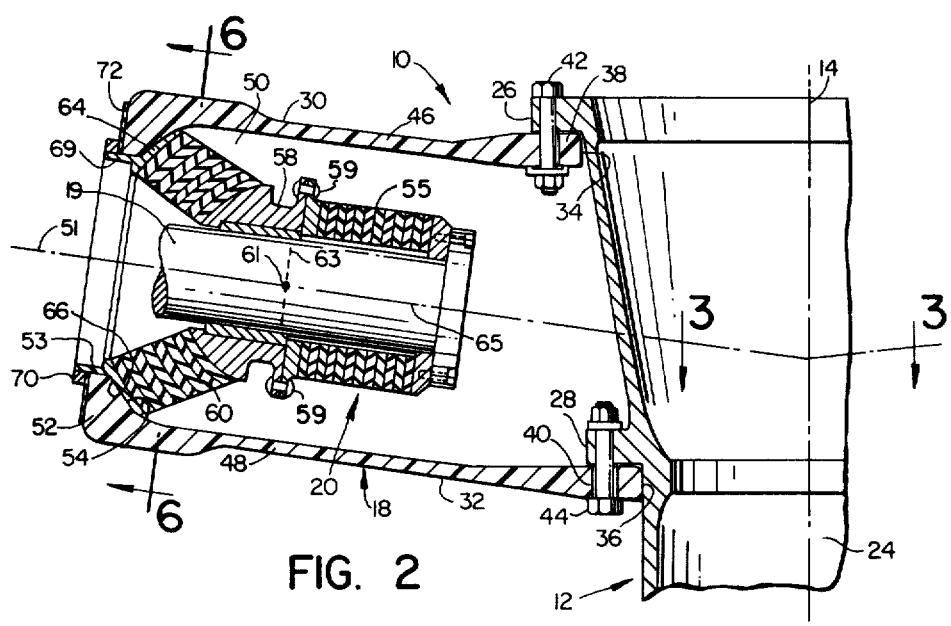
FIG. 2 is a somewhat enlarged fragmentary axial sectional view through the hub assembly of FIG. 1.

Turning now to the drawings and referring first particularly to FIGS. 1-3, a hub assembly for an articulated rotor system of a helicopter (not shown) and embodying the present invention is indicated generally by the reference numeral 10. The hub assembly 10 is particularly adapted for use on a UH-60 A helicopter and is shown mounted on a rotor shaft, indicated generally by the numeral 12, for rotation with the shaft in a conventional manner about an axis of rotation 14. A plurality of conventional rotor blades 16, 16 shown in FIG. 3, are supported on the hub assembly 10 and extend generally radially outwardly therefrom for rotation with the hub assembly to generate lift for the helicopter. The illustrated hub assembly 10 carries four rotor blades and comprises a unitary hub shell, indicated generally at 18, and a plurality of elastomeric blade retention bearing assemblies, designated generally by the numerals 20, 20. Each bearing assembly 20 receives a shaft 19 of an associated rotor blade 16, retains the blade in assembly with the hub shell, and supports it for articulate movement relative to the hub shell. As shown in FIG. 3, the hub assembly 10 has a pitch control mechanism associated with each blade 16 and indicated generally by the numeral 21. Each blade also has an associated lead-lag damping mechanism indicated generally at 23.

Referring now particularly to FIG. 2, the rotor shaft 12 comprises a tubular shaft extension 24 which is attached at its lower end by conventional means, which may include spline and cone seats (not shown), to the upper end portion of a conventional rotor shaft (not shown). The upper end portion of the shaft extension 24 diverges upwardly and has axially spaced upper and lower annular mounting flanges 26 and 28 integrally formed thereon and which extend radially outwardly therefrom. The upper mounting flange 26 has an outside diameter substantially larger than the outside diameter of the lower mounting flange 28. Each mounting flange has a downwardly facing annular seating surface and a ring of circumaxially spaced bolt receiving holes therein which open through its seating surface.

Considering now the hub assembly 10 in further detail, the hub shell 18 comprises a monolithic thin-wall shell, preferably formed from composite materials, and may, for example, comprise a laminated composite of woven fabric or fibrous sheet material. The shell 18 is preferably formed from layups of material pre-impregnated with a suitable binder, such as a polymer, and reinforced in critical areas with metal laminae. However, the presently preferred structure is formed from fibrous materials, as for example, a graphite-epoxy laminate of generally constant-thickness with fibres oriented in the 0°/90°/±45° directions, as illustrated in FIG. 7 wherein the X-axis corresponds to a radial direction. This orientation is appropriate for a four-bladed rotor system, because it produces somewhat symmetrical patterns of reinforcement that generally coincide with load paths. The specific orientation of the fibres will, of course, be chosen with reference to the shape of the hub assembly and the arrangement of its blade retentions. In forming the layup, the plies and local reinforcements may be stacked in sequence to achieve any desired interleaving consistent with required reinforcement.

The hub shell 18 has dished plate-like upper and lower portions, indicated at 30 and 32, respectively, integrally joined at the outer periphery of the shell and spaced apart at the inner regions of the shell. Coaxially spaced apart central apertures 34 and 36 formed in the upper and lower wall portions, as best shown in FIG. 2, receive the rotor shaft 12 coaxially therethrough. Annular retaining flanges surround the upper and lower apertures 34 and 36 to retain the hub shell 18 in connected relation with the rotor shaft 12 and with its central axis coaxially aligned with the axis of rotation 14 for rotation with the rotor shaft. More specifically, the upper wall portion 30 has an annular flange 38 which surround the aperture 34 and includes an upwardly facing seating surface for engaging the downwardly facing seating surface on the upper mounting flange 26. A ring of angularly spaced captive nuts is secured to the inner surface of the retaining flange 38 in registry with a ring of bolt holes in the retaining flange 38 and in alignment with corresponding bolt holes in the upper mounting flange 26. Fasteners 42, 42 secure the retaining flange 38 to the mounting flange 26, substantially as shown in FIG. 2. In like manner an annular retaining flange 40 is formed on the lower wall portion surrounding the aperture 36 and is secured in seating engagement with the downwardly facing seating surface on the lower mounting flange 28 by a ring of fasteners 44, 44. The fasteners 44, 44 may be engaged with captive nuts carried by the lower mounting flange 28, as shown, or if desired, may be engaged in threaded holes formed in the mounting flange. If desired, one of the mounting bolts may have a slight angular offset relative to the other mounting bolts to assure unique assembly relationship between the hub assembly 10 and the rotor shaft 12.

At this point it should be noted that central aperture 34 in the upper wall portion has a substantially larger diameter than the central aperture 36 in the lower wall portion. The diameter of the upper central aperture 34 is also somewhat larger than the outside diameter of the lower mounting flange 28 so that the lower mounting flange may pass through the aperture 34 to permit the hub shaft extension 24 to be inserted into the hub shell 18 from above.

Further considering the hub shell 18, the upper and lower wall portions 30 and 32 have integral outwardly bulged socket defining parts indicated at 46, 46 and 48, 48, respectively, which cooperate to define a plurality of generally cylindrical bearing sockets 50, 50 angularly spaced about the axis of rotation 14. The central axis of each bearing socket is indicated by the numeral 51 and is slightly offset relative to the axis of rotation, as best shown in FIG. 3, so that it does not intersect the axis of rotation 14. Each axis 51 is upwardly and outwardly inclined relative to the axis of rotation and lies generally within a conical upwardly diverging surface of revolution having its center on the axis of rotation 14. It should also be noted that the junction between the upper and lower wall portions 30 and 32 at the outer periphery of the hub shell 18 also lies generally within the aforesaid conical surface of revolution generated by about the axis of rotation 14.

A typical bearing socket 50, shown in FIG. 2, has an outer end wall 52 formed by the upper and lower wall portions 30 and 32 and disposed generally within a radial plane relative to its associated axis 51. The end wall 52 has a coaxially aligned central opening 53 therethrough an annular bearing surface 54 which surrounds the opening 53 and faces generally axially inwardly relative to the associated socket axis 51. The bearing surface is shaped to cooperate with a seating surface on an associated bearing assembly and will be hereinafter described in further detail and with reference to the bearing assembly. Parts of the upper and lower wall portions 30 and 32 define connecting webs which are contiguous with and extend between adjacent socket defining parts 46, 46 and 48, 48. Slots 56, 56 are formed in the web defining portions of the hub between angularly adjacent bearing sockets 50, 50 and at the peripheral junction between the upper and lower wall portions 30 and 32, substantially as shown in FIGS. 1 and 3.

Figure 6:
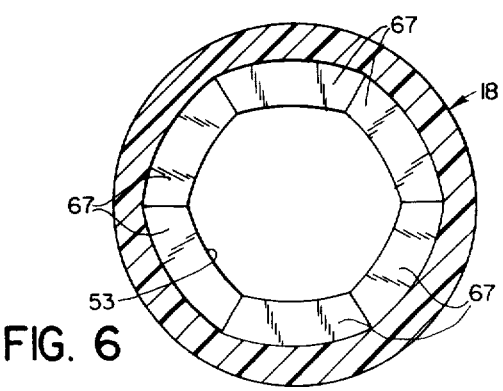
FIG. 6 is a sectional view taken along the line 6—6 of FIG. 2.

As previously noted, each bearing assembly 30 serves to retain an associated rotor blade 16 in connected assembly with the hub assembly 10 and supports the rotor blade for pitch change motion, lead-lag motion and flapping motion. A typical bearing assembly shown in FIG. 2 comprises an annular or flat disc-type elastomeric bearing 55, a connecting member 58, and a spherical bearing 60. The bearing 55 is formed by annular flat discs of elastomeric and rigid material alternately arranged in stacked relation and bonded together. An elastomeric spherical laminae at one end of the stack is bonded to a race or end plate 64. An elastomeric spherical laminae at the other end of the stack may be bonded to another race secured to the connecting member 58 by a conventional connecting means such as a plurality of threaded fasteners 59, 59, as shown in FIG. 2, or may be bonded directly to the connecting member. The spherical bearing member 60 comprises a plurality of spherically faced laminates of elastomeric and rigid material, such as metal, alternately arranged in stacked relation and bonded together. The spherically faced laminates are centered about the intersection of the blade flapping axis, indicated at 61 and the blade lead-lag axis 63 which is perpendicular to the blade flapping axis 61. The intersection of the latter two axes lies along the pitch change axis, which is indicated at 65 and which coincides with the axis of the shaft portion 19. The inner laminate, which is preferably elastomeric, is bonded to a spherical surface at the outer end of the connecting member 58. The laminate at the outer end of the bearing member 60, which is also preferably elastomeric, is bonded to a retaining member 64, as best shown in FIG. 14. The retaining member 64 has an axially outwardly facing seating surface 66 engaging and complementing the bearing surface 54. The seating surface 66 and the bearing surface 54 are preferably also generally centered about the intersection of the lead-lag axis 61 and the blade flapping axis 63, however, the surfaces 54 and 66 are non-spherical or of modified spherical form. The latter surfaces are arranged to cooperate incomplementary face-to-face engagement to restrain the bearing 20 against rotation about the associated pitch change axis 65. In accordance with the presently preferred embodiment of the invention, best illustrated in FIG. 6, the bearing surface 54 and the seating surface 68 which complements it are faceted, that is characterized by a plurality of smooth, flat or nearly flat circumscribed facts 67, 67. Each of the facets 67, 67 is generally tangent to a spherical surface of revolution having its axis at the intersection of the blade lead-lag axis 61 and the blade flapping axis 63. Each facet 67 has a radius of curvature substantially greater than the radius of curvature of the imaginary spherical surface to which it is tangent and has its center of curvature located along a line perpendicular to the point of tangency and passing through the intersection of the blade lead-lag axis 61 and the blade flapping axis 63. The retention member 64 which defines the seating surface 66 has a threaded sleeve portion 69 which extends outwardly through the opening 53 and receives an annular nut 70 which retains the bearing socket 50 and maintains the seating surface 66 and the bearing surface 54 in coengagement to prevent relative rotation therebetween. A metal droop-stop plate 72 is retained adjacent the outer face of the socket end wall 52 by the annular nut 70. The droop-stop plate 72 is adapted to cooperate with a droop-stop mechanism (not shown) to limit blade droop when the rotor is turning at low speed and when it is at rest.

Referring now particularly to FIG. 3, the pitch control mechanism 21 is of a generally conventional type and includes a plurality of pitch horns 74, 74. Each pitch horn 74 is connected at one end to an associated cuff of a rotor blade 16. The other end of each pitch horn 74 is connected by an associated pitch control rod 76 to a conventional swashplate 78, so that motion of the swashplate serves to vary the pitch of each blade 16 about its longitudinal axis.

The lead-lag damping mechanism associated with each blade comprises an hydraulic damper 79, which includes an hydraulic cylinder 80 containing a piston (not shown) connnected to a piston rod 82 which projects from the cylinder, as shown in FIG. 3. The cylinder 80 is attached to the hub shell 18 within an associated slot 56 by a spherical bearing and a connecting pin assembly, indicated generally at 83 in FIG. 5, which extends between upper and lower webs of the hub shell. The piston rod 82 at the other end of the damper is connected to an associated rotor blade 16 by a damper horn 84 secured to or forming an integral part of the blade cuff.

When the helicopter is to be transported in a cargo aircraft, for example, it may be necessary to remove the rotor system or lower it to a position adjacent the helicopter fuselage. The arrangement for connecting the hub assembly 10 to the rotor shaft 12, hereinbefore described, is convenient to either alternative. The hub assembly 10 and the shaft extension 24 ay be removed, as a unit, from the main rotor shaft, or if desired, threaded fasteners 42, 42 and 44, 44 may be removed so that the rotor system may be lowered on the main shaft 12 to a position above and immediately adjacent the helicopter fuselage, since the lower mounting flange 28 will pass freely through the upper hub aperture 34. No special tools are required.

To remove or replace one or more of the bearing assemblies 20, 20 the shaft extension 24 is first removed from the hub shell 18. The hub extension may be removed upwardly through the aperture 34 after the fasteners 42, 42 and 44, 44 have been removed, as previously noted. When the hub extension has been removed the various bearing assemblies 20, 20 are accessible through the aperture 34 which communicates with each of the bearing sockets and which is of sufficient size to allow a bearing assembly 20 to pass freely therethrough.

A further disclosure of the manner in which elastomeric bearing assemblies of the aforedescribed general type are constructed and arranged to support rotor blades for articulated motion is found in U.S. Pat. No. 3,759,632, to Rybicki, and in the various applications and patents identified therein, which is hereby adopted by reference as part of the present disclosure.

Figure 8:
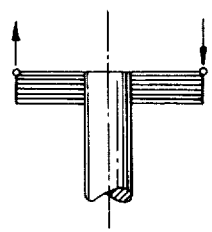
FIG. 8 is a schematic view and illustrates a conventional beam concept for a transverse load.

Transverse loads are those that lie in a direction perpendicular to the plane of the rotor hub and parallel to the centerline of the rotor drive shaft. The most important transverse loads are the vibratory 1/rev loads upon the hub caused when the pilot controls the aircraft by tilting the axis rotation of the rotor relative to the axis of rotation of the drive shaft. Of lesser importance but still significant is the symmetrical lift load. The conventional load path for transverse loads is to beam them to the rotor shaft as shown in FIG. 8.

Structures in accordance with the present invention transmit transverse loads also called vertical shears by direct, in-plane, axial loads in a diagonal plate, such as the plate 18, hereinbefore described. In effect, shear transfer is closely related to the shear transfer that occurs in a simple two-dimensional truss, and the present structure is so illustrated in FIG. 9. The real behavior, however, is much more redundant, because the hub assembly is a three-dimension structure. The load paths are highly redundant and diffuse so that the hub will be quite tolerant to areas of local balistics damage, as may occur in military operation. The present concept also has the advantage of permitting shear transfer to be accomplished through large areas of highly reliable primary bonds made during initial fabrication. The present concept also eliminates the heavy buildup and heavy bolted joint used in previous structures to transfer hub loads to the shaft spindle, since a hub spindle, as such, need not be employed.

Major loads are transmitted primarily by direct stresses and shears in the planes of the upper and lower wall portions of the hub which lie along efficient load paths. Centrifugal forces are bridged by the blade retention bearing assemblies to the planes of the upper and lower wall portions of the hub. The loads may be introduced into the composite plies by interleaved metal shims which provide large areas of bond surface for the composite. Once in the plates, the loads spread out, following highly redundant paths. Load diffusion may be fostered by a pattern of reinforcement, which provides load paths for centrifugal forces in both a rectangular ring direction from retention bearing to adjacent retention bearing and a radial direction from bearing to opposite bearing.

The aforedescribed hub provides a direct load path for torque without the use of splines and a central cylinder as in a conventional hub structure. Torque is transferred from the flanges on the drive shaft to the upper and the lower wall portions by fasteners. Metal fittings or laminae may be introduced to assist the transfer.

Vertical shears are produced at the blade retention bearings by the blade flapping and coning. The upper and the lower wall portions support the vertical shears by the truss action of the in-plane forces in each wall portion.

The hub assembly of the present invention may also be constructed for direct connection to a conventional splined rotor shaft and without the use of a shaft extension. Such a hub assembly is illustrated in FIGS. 10–13 and indicated generally at 10a. The hub assembly 10a is similar in many respects to the hub assembly 10 previously described. Each part of the hub assembley 10a which corresponds to a part of the previously described hub assembly 10 bears the same reference numeral as the previously described part with a letter "a" suffix and will not be hereinafter discussed in detail.

Figure 10:
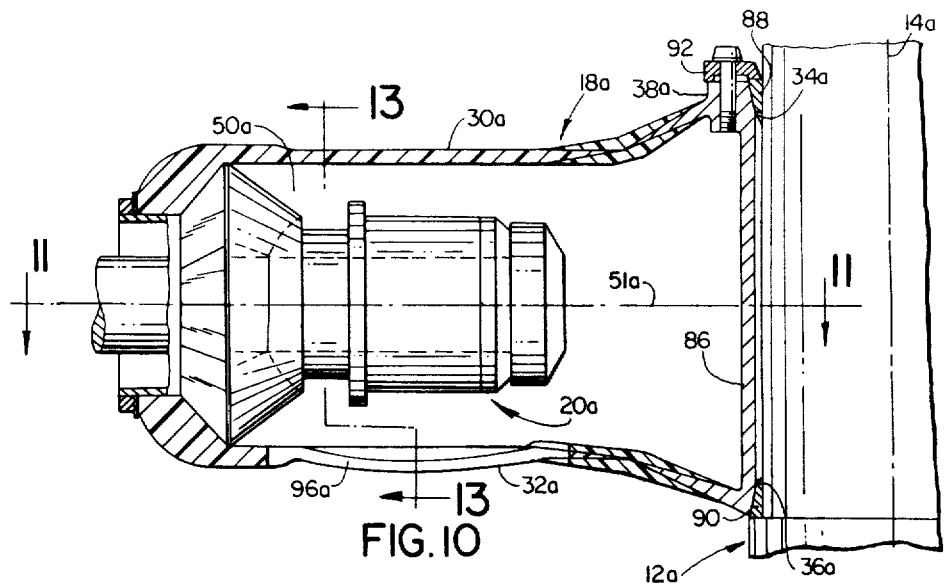
FIG. 10 is a fragmentary axial sectional view similar to FIG. 2, but shows another hub assembly embodying the invention.
Figure 12:
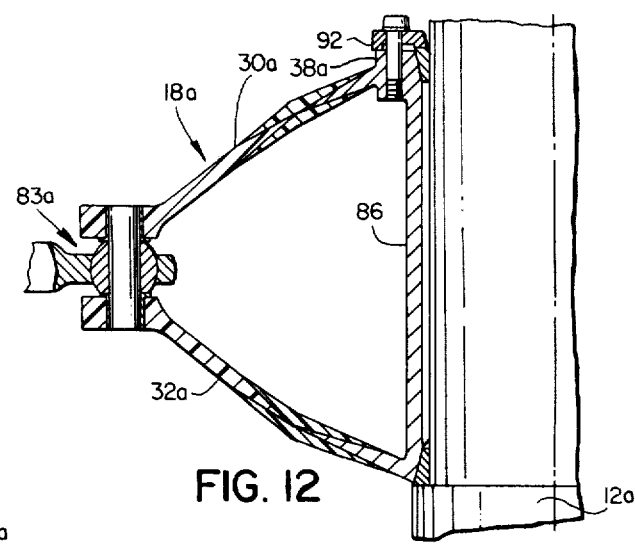
FIG. 12 is an axial sectional view taken along the line 12—12 of FIG. 11.
Figure 13:
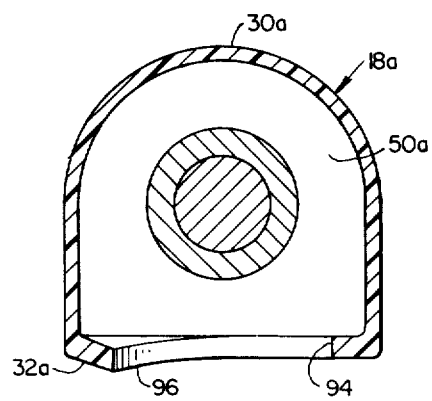
FIG. 13 is a sectional view taken along the line 13—13 of FIG. 10.

The hub assembly 10a includes a hub 18a and is shown in FIGS. 10 and 12 mounted on the upper end of a helicopter rotor shaft 12a which has a splined upper end portion. The hub 18a comprises a monolithic thin-wall shell of composite material which has upper and lower wall portions 30a and 32a joined at the outer periphery of the shell and which cooperate to define a plurality of bearing sockets 50a, 50a. The hub shell 18a also has web portions which are contiguous to and extend between adjacent bearing sockets. The upper and lower wall portions 30a, 32a are spaced apart within the inner regions of the hub shell and define coaxially aligned central apertures 34a and 36a. The hub shell 18a further includes a tubular sleeve portion 86 which extends between the upper and lower wall portions and which has a central bore coaxially aligned with the central apertures 34a and 36a. The sleeve portion 86 is preferably made of metal and has a splined bore to complement the splines on the rotor shaft 12a. The outer portions of the hub shell are formed separately and bonded to the metallic sleeve portion by suitable composite material. The hub assembly 10a is secured to the rotor shaft 12a in a generally conventional manner with upper and lower cone seats indicated at 88 and 90 and a retaining ring 92 which is bolted to a retaining flange 38a which generally surrounds the upper aperture 34a.

Figure 9:
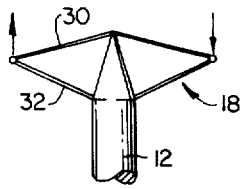
FIG. 9 is a schematic view and illustrates the truss loading of the present hub structure.

To facilitate removal of the rotor blades 16a, 16a and/or removal of the blade retention bearing assemblies 20a, 20a at least one access hole is provided in the hub shell which communicates with the bearing sockets 50a, 50a and which is of sufficient size to allow a bearing assembly 20a to pass through it. The illustrated hub assembly 10a carries four uncentered rotor blades 16a, 16a (one shown),, consequently the hub 18a is provided with four bearing sockets 50a, 50a, two of which are shown in FIG. 11. Each bearing socket has a central axis 51a which lies generally within a radial plane relative to the axis of rotation 14a. In the illustrated hub assembly 10a, four access holes 94, 94 are provided, each hole 94 communicating with an associated bearing socket 50a. The holes 94, 94 are formed in the lower wall portion 32a which is somewhat flattened in the area of the access holes, as shown in FIG. 9. If desired, each access hole 94 may be formed with a depending lip which faces in the direction of blade rotation to provide an air scoop for forced air circulation within the hub shell 18a to cool the elastomeric bearing assemblies 20a, 20a. Such a depending lip is indicated at 96 in FIGS. 10 and 13.

I claim:

1. An articulated rotor system for a helicopter and comprising a hub adapted for mounting to rotate about an axis, said hub having a bearing socket including an end wall at the radial outer end of said socket, said end wall having an aperture therethrough and a generally radially inwardly facing bearing surface surrounding said aperture, a rotor blade having a shaft concentric with the blade pitch change axis, said shaft extending through said aperture and into said socket, bearing means contained within said socket for connecting said blade to said hub and supporting said blade for articulated movement relative to said hub, said bearing surface being defined by a plurality of facets tangent to a spherical surface of revolution having its center at the intersection of said blade lead-lag axis and said blade flapping axis, said bearing means including a spherical, laminated elastomeric bearing having the spherically faced laminates thereof centered about the intersection of the blade lead-lag axis and the blade flapping axis, said laminates being annular in shape and receiving said shaft therethrough in spaced relation to said laminates, said spherical bearing having an outer end member attached to the outer lamination of said bearing and having a radially outwardly facing seating surface, said seating surface before assembly being defined by a plurality of additional facets complementing the facets defining said bearing surface, and means for releasably retaining said bearing means in assembly with said hub with said additional facets defining said seating surface in complimentary face-to-face engagement with said facets defining said bearing surface.

2. An articulated rotor system for a helicopter as set forth in claim 1 wherein said hub comprises a unitary hub shell and said end wall comprises an integral portion of said bearing socket.

3. An articulated rotor system for a helicopter as set forth in claim 1 wherein said retaining means comprises a threaded sleeve on said end member extending outwardly through said aperture and a nut threadably engaged with the outer end of said sleeve.

4. An articulated rotor system for a helicopter as set forth in claim 1 wherein the radius of curvature of each of said facets is equal to the radius of curvature of the other of said facets.

5. An articulated rotor system for a helicopter as set forth in claim 8 wherein said facets comprise substantially flat surfaces.

6. An articulated rotor system for a helicopter as set forth in claim 1 wherein said bearing surface is defined by at least six facets.

7. An articulated rotor system for a helicopter as set forth in claim 6 wherein each of said facets is substantially identical to the other of said facets.

* * * * *